United States Patent

El-Beltagy

(10) Patent No.: US 8,806,049 B2
(45) Date of Patent: Aug. 12, 2014

(54) P2P-ENGINE

(75) Inventor: Mohammed El-Beltagy, Stockholm (SE)

(73) Assignee: Peerialism AB, Stockholm (SE)

( * ) Notice: Subject to any disclaimer, the term of this patent is extended or adjusted under 35 U.S.C. 154(b) by 39 days.

(21) Appl. No.: 13/112,778

(22) Filed: May 20, 2011

(65) Prior Publication Data

US 2012/0210014 A1    Aug. 16, 2012

(30) Foreign Application Priority Data

Feb. 15, 2011 (SE) ........................................ 1150119

(51) Int. Cl.
*G06F 15/16* (2006.01)

(52) U.S. Cl.
USPC ........................................................ 709/231

(58) Field of Classification Search
CPC .................................................. H04L 67/1044
USPC ......................................... 709/205, 226, 231
See application file for complete search history.

(56) References Cited

U.S. PATENT DOCUMENTS

| | | | |
|---|---|---|---|
| 6,715,005 B1 | 3/2004 | Rodriguez et al. | |
| 7,698,460 B2 | 4/2010 | Zhang et al. | |
| 7,975,282 B2 | 7/2011 | Deshpande et al. | |
| 8,037,023 B2 * | 10/2011 | Liu et al. ...................... | 707/613 |
| 2004/0143672 A1 | 7/2004 | Padmanabham et al. | |
| 2005/0044147 A1 * | 2/2005 | Yap .............................. | 709/205 |
| 2006/0190615 A1 | 8/2006 | Panwar et al. | |
| 2006/0259607 A1 * | 11/2006 | O'Neal et al. ................ | 709/223 |
| 2008/0037527 A1 | 2/2008 | Chan et al. | |
| 2008/0205291 A1 | 8/2008 | Li et al. | |
| 2008/0263208 A1 * | 10/2008 | White ........................... | 709/226 |
| 2008/0294779 A1 * | 11/2008 | Gkantsidis et al. ........... | 709/226 |
| 2008/0317028 A1 * | 12/2008 | Chockler et al. .............. | 370/390 |
| 2009/0043893 A1 * | 2/2009 | Pendarakis et al. ........... | 709/226 |
| 2009/0106802 A1 * | 4/2009 | Zuckerman et al. ............ | 725/91 |
| 2009/0119265 A1 * | 5/2009 | Chou et al. ........................ | 707/3 |
| 2009/0119734 A1 | 5/2009 | Deshpande et al. | |
| 2009/0154476 A1 * | 6/2009 | Kobara ......................... | 370/400 |
| 2009/0164576 A1 * | 6/2009 | Noh et al. ..................... | 709/204 |
| 2009/0177792 A1 | 7/2009 | Guo et al. | |

(Continued)

OTHER PUBLICATIONS

Roberto Roverso: On the Feasibility of Centrally-Coordinated Peer-To-Peer Live Streaming.*

(Continued)

*Primary Examiner* — Asad Nawaz
*Assistant Examiner* — Syed S Ali
(74) *Attorney, Agent, or Firm* — Myers Bigel Sibley & Sajovec, PA

(57) ABSTRACT

A peer-to-peer (P2P) overlay network, which comprises a streaming source and a plurality of peers arranged in distribution layers, is arranged such that the total number of distribution layers of the overlay network is reduced. First, the upload capacity of each individual peer is determined and a maximum number of overlay peers to which said each individual peer can upload is calculated. Then, the peers are arranged in hierarchical order in relation to the streaming source on the basis of the maximum number of peers to which each individual peer can upload data. A higher number results in the individual peer being arranged in a distribution layer closer to the streaming source while a lower number results in the individual peer being arranged in a distribution layer further from the streaming source. Thus, the total number of distribution layers of the overlay network is reduced.

18 Claims, 5 Drawing Sheets

(56) References Cited

U.S. PATENT DOCUMENTS

| | | | |
|---|---|---|---|
| 2009/0234917 A1* | 9/2009 | Despotovic et al. | 709/204 |
| 2009/0323700 A1* | 12/2009 | Schwan et al. | 370/400 |
| 2010/0014528 A1* | 1/2010 | Amir et al. | 370/400 |
| 2010/0049869 A1* | 2/2010 | Jayaram et al. | 709/242 |
| 2010/0098103 A1* | 4/2010 | Xiong et al. | 370/406 |
| 2010/0146053 A1* | 6/2010 | Jiang | 709/204 |
| 2010/0146092 A1* | 6/2010 | Hu et al. | 709/223 |
| 2010/0146569 A1 | 6/2010 | Janardhan et al. | |
| 2010/0250678 A1* | 9/2010 | Hu et al. | 709/204 |
| 2010/0262709 A1 | 10/2010 | Hiie et al. | |
| 2010/0287272 A1* | 11/2010 | Berkey et al. | 709/223 |
| 2011/0004681 A1* | 1/2011 | Das et al. | 709/224 |
| 2011/0161417 A1* | 6/2011 | Le Scouarnec et al. | 709/204 |
| 2011/0307115 A1* | 12/2011 | Pereira et al. | 700/296 |
| 2012/0030333 A1* | 2/2012 | Hu et al. | 709/223 |
| 2013/0132601 A1* | 5/2013 | El-Beltagy et al. | 709/231 |

OTHER PUBLICATIONS

Roberto Roverso, Amgad Naiem, Mohammed Reda, Mohammed El-Beltagy, Sameh El-Ansary, Nils Franzen and Seif Haridi, on the Feasibility of Centrally-Coordinated Peer-To-Peer Live Streaming, the 8th Annual IEEE Consumer Coummuncations and Networking Conference—Special Session on Scalable Adaptive Multicast in P2P Overlays, pp. 1061-1065.

International Search Report, Application No. PCT/EP2012/072411, Feb. 20, 2013.

Written Opinion of the International Searching Authority, Application No. PCT/EP2012/072411, Feb. 20, 2013.

International Search Report, Application No. PCT/EP2012/069509, Feb. 28, 2013.

Written Opinion of the International Searching Authority, Application No. PCT/EP2012/069509, Feb. 28, 2013.

Roverso et al., "Peer2View a Peer-To-Peer HTTP-Live Streaming platform", *IEEE 12$^{th}$ International Conference on Peer-to-Peer Computing (P2P)*, Sep. 3, 2012, pp. 65-66.

Small et al., "Scaling Laws and Tradeoffs in Peer-to-Peer Live Multimedia Streaming" *Multimedia '06 Proceedings of the 14th annual ACM international conference on Multimedia,* Jan. 2, 2006, pp. 539-548.

Microsoft, "Microsoft Computer Dictionary," 2002, Fifth Edition, Microsoft Corporation, Redmond, WA.

* cited by examiner

P2P-ENGINE

BACKGROUND ART

The use of the Internet's infrastructure for video streaming has proliferated over the last few years as broadband internet access is becoming widely available. Many commercial deployments have relied on hardware based IP multicast routers that are placed strategically within networks maintained by Internet Service Providers (ISPs) to stream video traffic. However, such hardware based approaches are quite expensive to setup and difficult to extend beyond the bounds of a single ISP.

To circumvent the problem of having to deploy and setup expensive multicast routers, an alternative approach is to strategically place high availability servers close to target customers and have them download from those servers. Such an approach also suffers from the expenses of buying the necessary bandwidth from Content Delivery Networks (CDNs). Such bandwidth may often not quite match the customers' demands, resulting in either over or under investment.

In order to attain greater flexibility and minimize bandwidth purchases, software based approaches for media dissemination has been presented. Such approaches came to be known as application level multicast (ALM). These approaches exploit to varying degree the available upload bandwidth that end users have to forward video streams.

Peer-to-peer (P2P) networks comprise any networks having a distributed network architecture composed of entities that each provides access to a portion of their resources (e.g., processing capacity, disk storage, and/or bandwidth) to other entities. The P2P concept differs from traditional client/server architecture based networks where one or more entities (e.g., computers) are dedicated to serving the others in the network. Typically, entities in a P2P network run similar networking protocols and software. Applications for P2P networks are numerous and may for example comprise transporting and/or storing data on the Internet, such as video distribution for content owners.

P2P streaming approaches can be broadly divided into two categories: tree-based and mesh-based. In the tree-based approaches, one or more tree overlays are constructed through which sub-streams are disseminated from a root node of each tree to all the nodes in the network. Such approach may allow for a degree of fault tolerance where Multiple Descriptor Coded (MDC) content is pushed, one descriptor at a time, through each tree. In contrast in the mesh-based approaches, nodes randomly interact with each other, and explicitly request data which they do not have from other nodes. These two approaches have complementary advantages and disadvantages. The tree approach has an advantage in that it can push data at a high rate to the nodes in the tree, without a high setup cost. However, its structure is relatively inflexible. The mesh-based approaches have the advantage that they are very resilient to failures and churn, as no specific rigid overlay structure, such as a tree, needs to be maintained. Its disadvantage is that it can have a long setup time, as nodes need to negotiate with each other to find peers.

SUMMARY OF THE INVENTION

An object of the present, invention is to connect peers in an overlay network in an efficient manner such that overall system performance is enhanced.

This object is attained by a method and device for arranging a P2P overlay network in accordance with the independent claims. Preferred embodiments are defined by the dependent claims.

To this end, a P2P overlay network, which comprises a streaming source and a plurality of peers arranged in distribution layers, is arranged such that the total number of distribution layers of the overlay network is reduced. First, the upload capacity of each individual peer is determined and a maximum number of overlay peers to which said each individual peer can upload is calculated. Then, the peers are arranged in hierarchical order in relation to the streaming source on the basis of the maximum number of peers to which each individual peer can upload data. A higher number results in the individual peer being arranged in a distribution layer closer to the streaming source while a lower number results in the individual peer being arranged in a distribution layer further from the streaming source. Thus, the total number of distribution layers of the overlay network is reduced.

Thus, P2P overlay distribution layer reconfiguration is initially carried out. Any given prior art overlay network will have a certain number of distribution layers, and each layer will most likely comprise peers which mutually uploads different amounts of data. From a bandwidth perspective, this is not a good overlay configuration. For instance, a peer capable of uploading a great amount of data should be located early in a distribution chain starting with the streaming server, and not late or at the end of the distribution chain. Similarly, a peer with a small upload capacity should not act as a bottleneck early on in the distribution chain.

Since all peers are sorted based on the maximum number of other peers to which they can upload data given a certain upload capacity, known as the "seat count", the problem of having large-capacity peers located in a distribution layer far from the streaming server ears be eliminated. After having sorted all overlay peers, the peers with high seat count are seated in the first distribution layer, and the process continues until all peers have been placed in the required distribution layer. This not only facilitates good upload bandwidth utilization, but also results in an overlay that has a reduced number of distribution layers. Hence, the average number of hops from the streaming server to the peers is reduced, which directly translates info smaller playback delays. This is highly advantageous in a P2P network.

In an embodiment of the present invention, the number of peers placed in a distribution layer being closest to the streaming source is selected to be as low as possible while still being able to provide a total streaming bandwidth satisfying a predetermined bandwidth threshold value. In other words, large-capacity peers are typically placed in the first distribution layer, i.e. the layer being closest to the streaming server, and the number of peers in the first distribution layer is held at a minimum while providing sufficient bandwidth for the rest of the network. Given a minimum threshold requirement which the first distribution layer must be capable of providing with respect to bandwidth, the number of peers in the first layer is selected such that this requirement is met. For instance, if the minimum bandwidth requirement of the first distribution layer is set to 512 kbps and each peer to be placed in the first layer is capable of uploading 256 kbps, then two peers should be placed in the first distribution layer such that predetermined bandwidth criteria can be met. Thus, minimizing the number of peers placed in the first distribution layer advantageously prevents sub-optimizations with respect to provided bandwidth capacity for the rest of the network; the number of peers placed in the first distribution layer is selected such that sufficient bandwidth is provided to the remaining peers in the P2P network, while the bandwidth capacity of the first layer is not oversized.

In another embodiment of the present invention, the peers are arranged in the overlay by taking into account one or more of: peer upload bandwidth, peer download bandwidth, most recently downloaded part for each sub-stream, downloading peer list, uploading peer list, NAT type, peer CPU load, current playing point in the stream, rebuffering time and peer IP address.

In yet a further embodiment of the present invention, peers which previously have been reported to fail other downloading peers will be penalized, i.e. moved down in the hierarchy, and thus placed in a distribution layer further away from the streaming source, potentially even further away than what is justified by the determined number of other overlay peers to which the penalized peer uploads data. This is advantageous in order to maintain system robustness.

In still another embodiment of the present invention, if a certain peer cannot be placed in an associated distribution layer due to e.g. bandwidth availability or NAT compatibility, the peer can be connected to peers located in a distribution layer closer to the streaming source. Ultimately, if all else fails, said certain peer can be connected directly to the streaming source. This embodiment is particularly advantageous for joining peers, which can experience these types of problems more often than peers already placed in the overlay.

In another embodiment of the present invention, a utility matrix comprising selected network parameters is created for a first peer in distribution layer r and a second peer in distribution layer r−1 to be connected to the first peer. A Linear Sum Assignment Problem (LSAP) is solved using the created utility matrix and the solution to the problem is considered when arranging the peers in hierarchical order.

At the core of a P2P system comprising the present invention is a device, referred to as a connectivity engine, for arranging the P2P overlay network. The device comprises a processor configured to receive peer information indicating upload capacity for each peer and calculate a maximum number of overlay peers to which said each peer can upload data. Further, the processor is configured to arrange the peers in hierarchical order in relation to the streaming source on the basis of the maximum number of peers to which said each individual peer uploads data, wherein a higher number results in said each individual peer being arranged in a distribution layer closer to the streaming source while a lower number results in said each individual peer being arranged in a distribution layer further from the streaming source, such that the total number of distribution layers of the overlay network is reduced. Finally, the processor of the connectivity engine sends connectivity orders to the peers, thereby indicating the hierarchical order according to which the peers should be placed in the distribution layers. Thus, each individual peer receives an instruction to which other peer(s) is should connect. Typically, this will imply a reordering of the peers in the distribution layers. Different embodiments of the inventive connectivity engine have been outlined in the above.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

Exemplifying embodiments of the invention will be described below with reference to the accompanying drawings, in which.

DETAILED DESCRIPTION OF THE INVENTION

High-Level Architecture

Figure 1:
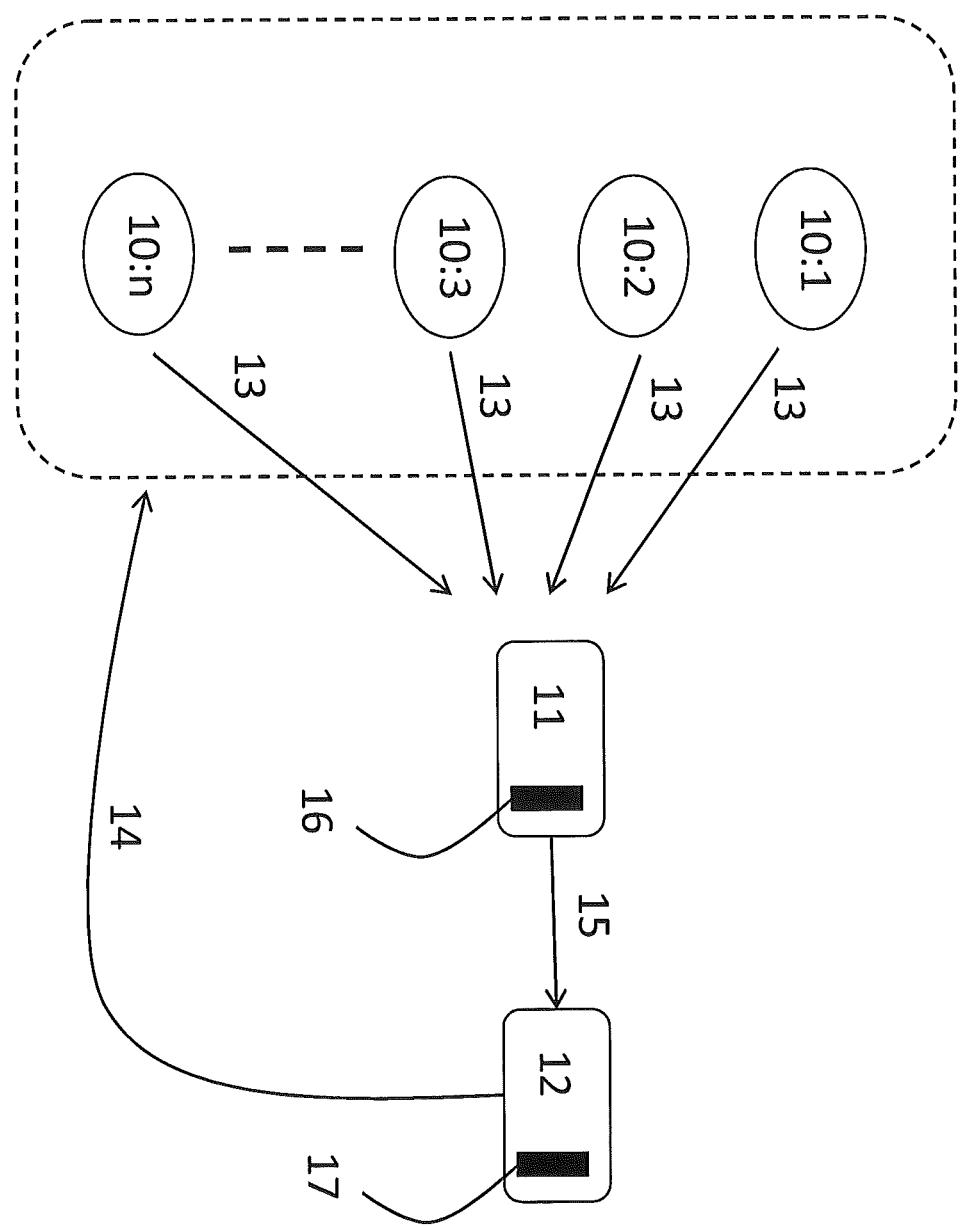
FIG. 1 shows a prior art P2P system including a plurality of peers and a tracker, to which system a connectivity engine in accordance with embodiments of the present invention is connected.

FIG. 1 shows a prior art P2P system in the form of a plurality of peers $10:1, 10:2, 10:3, \ldots, 10:n$ and a so called tracker 11 with which the peers communicate. Further, FIG. 1 shows a connectivity engine 12 in accordance with the present invention, which is connected to the tracker and the peers. FIG. 1 is by means of illustration only: the engine could functionally be part of the tracker and from hardware point of view be located in the same functional block. Both the tracker and the engine are typically devices with computing facilities embodied in the form of processors 16, 17, Thus, the tracker and the engine are typically implemented as computers executing appropriate software stored in associated memory for procuring required functionality. However, other suitable devices with computing capabilities could be used, e.g. an application specific integrated circuit (ASIC), a field programmable gate array (FPGA), a complex programmable logic device (CPLD), etc., in order control the P2P system and arranged the overlay as will be described in the following, while executing appropriate downloadable software stored in a suitable storage area, such as a RAM, a Flash memory or a hard disk.

In the P2P system illustrated in FIG. 1, the tracker 11 receives information or states 13 of joining and existing peers 10 and collates for the connectivity engine such that connectivity orders 14 can be determined and issued. In most commonly deployed P2P systems such as Bittorrent, the tracker sends each peer a list of peers that they can try to connect to. Each peer uses this list to negotiate connections. In contrast, in the present invention, the tracker plays a passive role of simply receiving peer states and filtering the relevant details 15 for the engine. The engine uses the state of the respective peer to construct a more efficient overlay. The engine then issues orders to peers as necessary such that the new improved network overlay can be realized. In embodiments of the invention, the peer states can contain one or more parameters on which the engine will act in order to determine connectivity orders. In the following, the terms "peer information" and "peer state" are equivalents.

Streaming Server Bandwidth Load Reduction

One of key advantages of using a P2P system for streaming transport instead on relying on CDNs is the cost savings associated with having the peers shoulder a substantial transmission load. A streaming server could hence be on a much smaller capacity while serving as many peers for the same quality of service as in a setup without P2P transport.

If overlays are constructed such that no peer is uploading a sub-stream to a peer with a lower upload bandwidth capacity, and the streaming server is uploading to the highest uploading bandwidth peers, the server will not be wasting any bandwidth. One can see why this scheme achieves the highest utilization for the streaming server if a scenario is considered where peers with zero upload bandwidth are connected directly to the server. In that case, the bandwidth of the streaming server would be fully consumed by such peers while high upload bandwidth peers would be blocked out of the system.

If the upload capacity of all joining peers where known in advance, the minimum upload capacity for the streaming server could be calculated. In practice, more upload capacity could be allotted to the streaming server to allow for peer churn (i.e. peers joining/leaving the network) and to account for potential inefficiency-due to e.g. network address translation (NAT) constraints.

Overlay Improvement

A stream is divided into a number of sub-streams referred to as stripes. For instance, if the stream rate is 1 Mbps, and 4 stripes are used, each stripe would constitute a sub-stream of 256 kbps. Given a peer with an upload capacity of 1.5 Mbps which distributes data to 6 other peers with a maximum upload capacity of 256 kbps, this peer is said to have 6 "seats" because it can upload 6 stripes simultaneously to other peers with a predetermined upload bandwidth. Such division of bandwidth and seats is made so that the connectivity engine can have a simple model of the bandwidth/upload capacities of the peers. In a case where data of an original stream is spread over a number of sub-streams, where none of the sub-stream comprises overlapping data, each peer needs to be downloading all the sub-streams in order to be able to reconstruct the original stream. Such a scenario shifts the transmission load from the streaming server to the peers. At the other extreme, where the data of the original stream is spread over a number of sub-streams, where all sub-streams comprises identical data, each peer needs to be downloading only one of the sub-streams in order to be able to reconstruct the original stream. In this example, burden of transmission is shifted to the streaming server.

A more complex case involves usage of Forward Error Correction (FEC) when distributing data to overlay peers. In FEC, redundancy is added to the information to be transmitted in order to e.g. overcome a noisy channel. The more redundancy added the better is the chance of restoring the originally transmitted data. On the other hand, the addition of redundancy will typically increase transmission bandwidth or message delay. However, an advantage to be achieved in P2P networks when using FEC is that a peer only needs to receive a subset of the original stream since the redundancy added facilitates restoration by processing only a part of the original stream.

In yet an example, MDC is employed. Assuming that a movie in the form of a video stream is to be distributed which requires 1024 kbps to be watched at highest level of quality. The stream can be broken down into four MDC stripes, each at 256 kbps. The nature of the MDC stripes is such that any of the four stripes can be used to watch the movie with varying degree of quality. If a peer is able to access three seats (i.e. download three stripes), said peer will watch the video at a quality that is lower than the highest quality level, and another peer with access, to only one stripe will be watching the video at the lowest quality level. Each peer can only upload as many stripes as it is downloading, regardless of the number of seats it has access to, i.e. the upload bandwidth is equal to the download bandwidth. Thus, a peer that is downloading stripe no. 1, 3 and 4 can only upload those particular stripes to its seats. Still, if the number of peers downloading the stream with top quality is to be maximized, the peers should preferably be ordered by seat count such that those with a higher bandwidth is placed closer to the streaming source.

Distribution Layer Construction

As mentioned above, the connectivity engine issues orders to peers as necessary such that a new improved network overlay can be realized and the peer states can contain one or more parameters on which the engine will act in order to determine connectivity orders. In the following embodiment of the invention, the engine will act on a parameter referred to as seat count. The concept of seat count assumes that the sub-streams of the P2P network substantially have the same capacity.

In a first step of an exemplifying embodiment of the present invention, P2P overlay distribution layer reconfiguration is carried out. This is illustrated in FIGS. 2a and b, where FIG. 2a shows the overlay before distribution layer reconfiguration and FIG. 2b shows the overlay after reconfiguration.

Figure 2A:
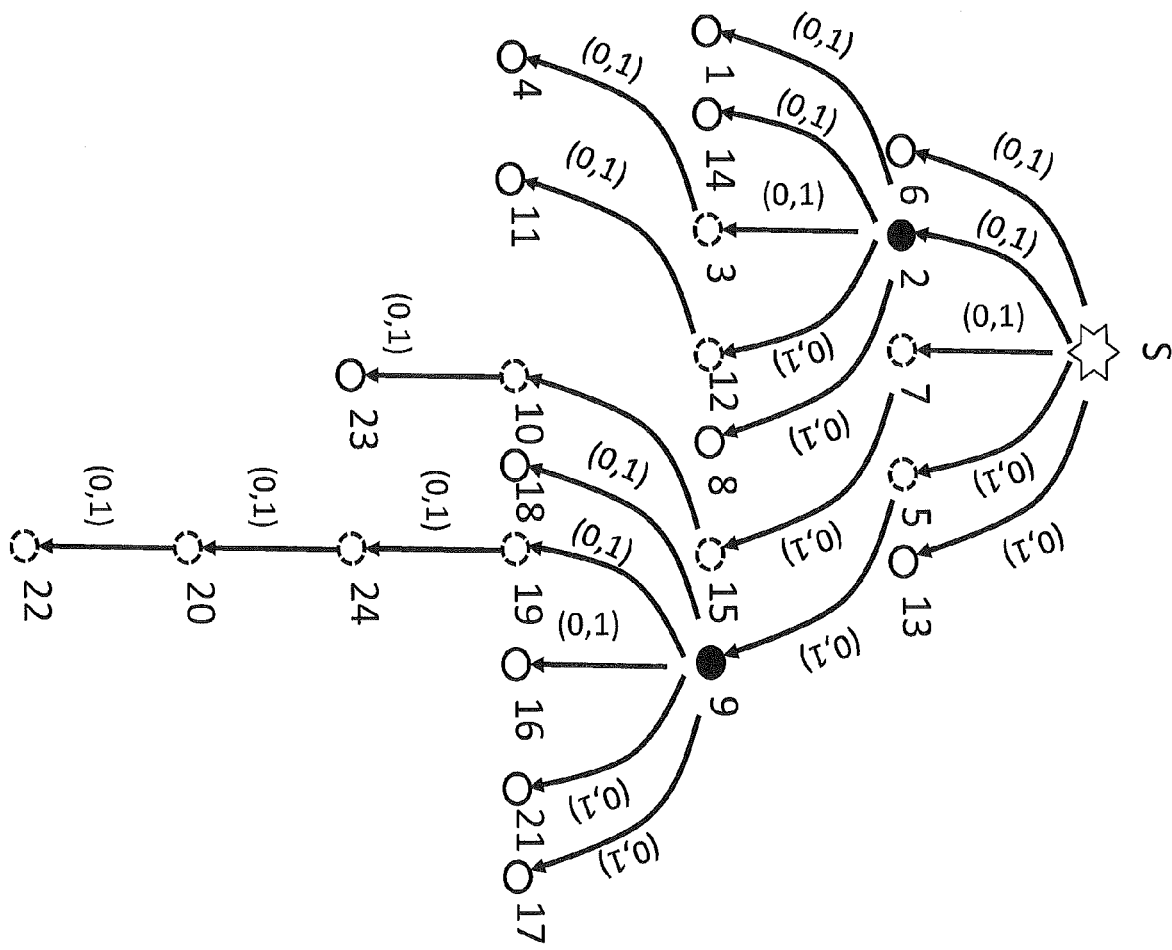
FIG. 2a shows an exemplifying P2P overlay before distribution layer reconfiguration has been undertaken.
Figure 2B:
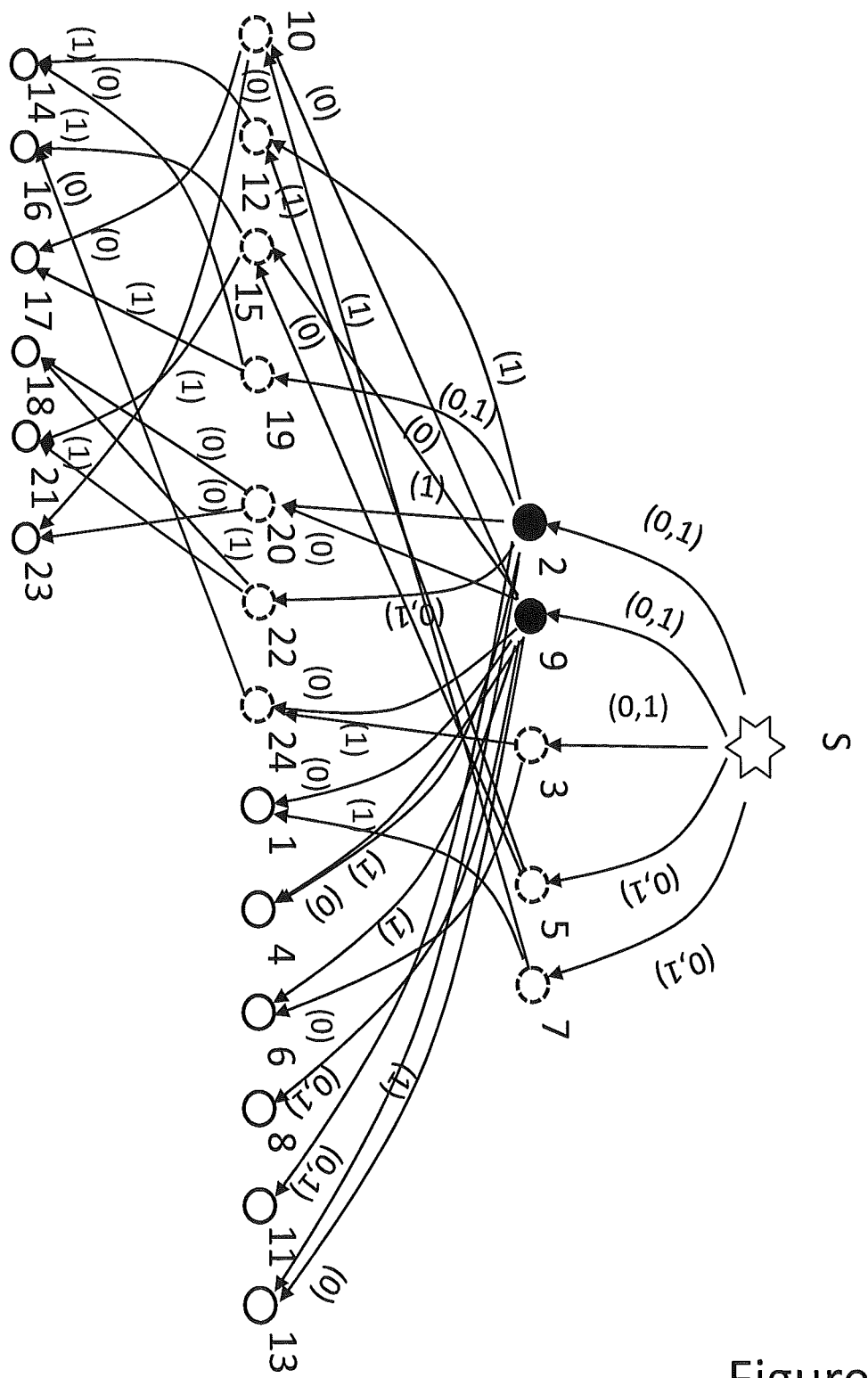
FIG. 2b shows an exemplifying P2P overlay after distribution layer reconfiguration has been undertaken in accordance with an embodiment of the present invention.

In FIG. 2a, the streaming server is denoted S, and distributes a data stream denoted (0,1), composed of sub-streams 0 and 1, to peers no. 6, 2, 7, 5 and 13. Neither peer 6 nor peer 13 uploads to any further peers, while peer 2 uploads to peers 1, 14, 3, 12 and 8; peer 7 uploads to peer 15, and peer 5 uploads to peer 9, and so on. In this example, before distribution layer configuration has been undertaken, there are 6 distribution layers in the overlay, and in this particular example, data streamed from the server to peer 22 will travel across all distribution layers, from the streaming server S to peer 5 in the first distribution layer, from peer 5 to peer 9 in the second distribution layer, and so on, until peer 20 in the fifth distribution layer finally distributes the data stream to peer 22 in the sixth distribution layer. Now, as is illustrated in FIG. 2a, peers 2 and 9 obviously have the capability to upload at least five full data streams to other peers. Thus, the engine is assured that these two particular peers will be able to upload at least ten sub-streams, i.e. five full streams each to other peers. Table 1 in the following illustrates the uploading capacity of all peers in the overlay of FIG. 2a.

TABLE 1

| Upload capacity a peers in the overlay. | | |
|---|---|---|
| Peer no. | Uploads to peer no. | Seat count |
| S | 2, 5, 6, 7, 13 | 5 |
| 9 | 16, 17, 18, 19, 21 | 5 |
| 2 | 1, 3, 8, 12, 14 | 5 |
| 3 | 4 | 1 |
| 5 | 9 | 1 |
| 7 | 15 | 1 |
| 10 | 23 | 1 |
| 12 | 11 | 1 |
| 15 | 10 | 1 |
| 19 | 24 | 1 |
| 20 | 22 | 1 |
| 24 | 20 | 1 |
| 1 | — | 0 |
| 4 | — | 0 |
| 6 | — | 0 |
| 8 | — | 0 |
| 11 | — | 0 |
| 13 | — | 0 |
| 14 | — | 0 |
| 16 | — | 0 |
| 17 | — | 0 |
| 18 | — | 0 |
| 21 | — | 0 |
| 22 | — | 0 |
| 23 | — | 0 |

Thus, a P2P overlay reconfiguration is carried our based on the figures of Table 1. First, all the peers are sorted in accordance with their seat count. In this particular example, there are three hierarchical levels; either the seat count is 5, 1 or 0, where seat count 5 is the highest order and seat count 0 is the lowest order. The peers with high seat count are seated in the first distribution layer, and the process continues until all peers have been positioned in the required distribution layer. This not only maximizes upload bandwidth utilization, but also results in an overlay that has minimum number of distribution layers. Hence, the number hops from S to any peer is minimized, which directly translates into smaller playback delays. At this step, the engine is assured that every distribution layer can provide enough seats for the layers below.

At this point, an important part of a decision process has been done by sorting the peers and compacting the distribution layers. Now, the overlay can be further improved by taking into account other parameters reported in the peer states, including one or more of: upload bandwidth, download bandwidth, most recently downloaded part for each sub-stream, downloading peer list, uploading peer list, NAT type, CPU load, current playing point in the stream, rebuffering time, peer IP address, etc.

The full state information of a peer should be reported to the connectivity engine occasionally. Some peer state parameters need to be updated more often than others. For example, determining the NAT type need only be done at the start of a data stream. Further, the available upload bandwidth of a peer is less likely to change as frequently as e.g. the current playing point in the stream. The update time for each of those state elements should be chosen to provide the engine with sufficient information to carry out intelligent decisions, but should be short enough not to overwhelm it with superfluous information. The engine can safely extrapolate certain state information, such as the current playing point, from past readings.

Again with reference to FIG. 2, another embodiment of the present invention is described, where the number of peers placed in the first distribution layer is held at a minimum, while still providing sufficient bandwidth to the rest of the P2P network. In FIG. 2a, it can be seen that in this particular example, the streaming server S and distributes a data stream denoted (0,1), composed of sub-streams 0 and 1, to peers no. 6, 2, 7, 5 and 13. If predetermined criteria is that "the first distribution layer should be able to stream data at least with the capacity of the streaming server", then if would suffice to place (with reference to Table 1) either peer no. 2 or 9 in the first distribution layer and subsequently place the other one of the two highest-capacity peers in the second distribution layer (possibly together with peers no. 3, 5 and 7 in analogy with the illustration of FIG. 2b), and so on until all peers have been placed in the appropriate distribution layers.

Peer Connectivity Utility

As mentioned in the above, in addition to upload bandwidth, the placing of peers in distribution layers can in further embodiments of the present invention be effected by peer state information comprising other parameters such as NAT compatibility and peer reliability which could be a function of CPU load and other spurious factors like inter-ISP network congestion. Peers that have been reported to fail their downloaders have their reported bandwidth penalized. In an embodiment of the present invention, such a penalty could be implemented in the form of a transfer of the peer to a lower distribution layer, i.e. a layer positioned further away from the streaming source.

NAT compatibility considerations can necessitate that peers are moved up or down in the distribution layers so as to increase bandwidth utilization. A fast heuristic optimization algorithm has been developed to achieve this task, known as the Deep Greedy Switch. For details, reference is made to A. Naiem and M. El-Beltagy: "Deep greedy switching: A fast and simple approach tor linear assignment problems", 7th International Conference of Numerical Analysis and Applied Mathematics, 2009. The advantages of using this algorithm will be discussed further in the following.

To exploit the flexibility of connectivity between peers in successive distribution layers, so called utility values can be calculated for an uploading peer seat i and a downloading peer j. The utility values for possible pairwise connection can be ordered in a row-wise utility matrix $A^r$ which define selected utility metrics for peers placed in distribution layers r−1 and r, respectively. The utility values $A^r(i, j)$ are calculated as a weighted sum of selected parameters forming these utility metrics between seats in layer r and a peers in layer r−1. The selected parameters can be composed of (but are not limited to):

(a) Inter-peer delay; peers with lower delay are favored, (b) Stickiness; connections in the overlay that already exist are favored to minimize interruptions, (c) Buffer matching, seats with buffers who have data that is useful to the persons are favored, where usefulness is proportional to how much the uploading peer is more advanced in a sub-stream compared to the downloading peer, (d) NAT Compatibility; defines the probability of a connection to succeed between two peers. A value is given accordingly to reflect probability of connection.

(e) ISP Friendliness; peers in the same autonomous system (AS) are favored. The engine may compute a hop count between ASs and as a result favor the smaller distance.

Assigning peers to seats can hence be modeled as a Linear Sum Assignment Problem (LSAP).

In this context, by a "linear sum assignment problem" it is referred to a problem of finding a maximum weight in a weighted bipartite graph. Alternatively, the problem can be formulated as follows. There is given a number n of service providers (or agents) and a number m of service receivers (or tasks or jobs). Any agent can be assigned to perform any task, where the assignment to a given agent to a given job incurs a predetermined cost. The problem is then to assign each agent to a task in such a way that the total cost of the assignment between the agents and the jobs is minimized, given that each agent can only be assigned to a single job, or to use the particular terminology of the present application; the problem is to assign peers to seats.

Maximizing System Utility

An instance of LSAP needs to be solved for every two consecutive distribution layers. In a system of R distribution layers, this translates to R instances of LSAP. Each instance can be solved in parallel. A well-known and oftentimes used algorithm for solving LSAP is the Auction algorithm.

For a system where each distribution layer may contain thousands of peers, the auction algorithm would solve the instances too slow. As mentioned in the above, the much faster Deep Greedy Switching (DGS) algorithm would be a better choice. DGS deviates little from the Auction algorithm in terms of optimality, but is considerably faster. Compared with the Auction algorithm, DGS has the added advantage that it starts out with an initial assignment and improves that assignment during the course of its execution. The auction algorithm, however, attains full assignment only at termination. Hence, if a deadline has been reached where an assignment must be produced, DGS can be interrupted to get the best assignment solution it has attained so far. Overlay optimization is carried out periodically to maintain the P2P at near optimal state. However, between such periods peers are joining and leaving, and the overlay needs to be maintained until the next overlay optimization order is sent out.

Overlay Maintenance

Peer Joins

Peers with different number of seats join the network in an arbitrary order. The connectivity engine places a given joining peer in the distribution layer that best matches its seat capacity, i.e. after having established a hierarchical order as has been discussed previously. In an embodiment of the present invention, if the joining peer cannot be placed in a certain distribution layer due to e.g. bandwidth availability or NAT compatibility, the engine connects the joining peer to peers in a distribution layer closer to the streaming source and ultimately, if all else fails, directly to the source. If the engine determines that a number of potential peers of equal hierarchical order exist that it could connect the joining peer to, it selects the one which would result in highest connectivity utility value after having solved an LSAP with appropriately selected parameters as input values to the utility matrix. Correspondingly, if multiple peers join the network simultaneously, the engine will construct an LSAP and proceed to solve it.

The engine monitors the join and failure histories and based thereupon reserves some seats in the distribution layers, in anticipation of future joins or failures. The objective here is to minimize direct source bandwidth load that may result due to churn.

Peer Failures

As peers leave the P2P network, they may adversely affect the peers that they are uploading to, which are still in the network. Those "orphaned" peers will then have to find alternative connections to uploading peers in distribution layers further away from the source. The engine will search for a suitable downloading peer for each of those orphans. The mechanism for doing so is similar to that for peer join, with the added parameter of buffer matching when selecting amongst peers.

Connectivity Engine Components

Figure 3:
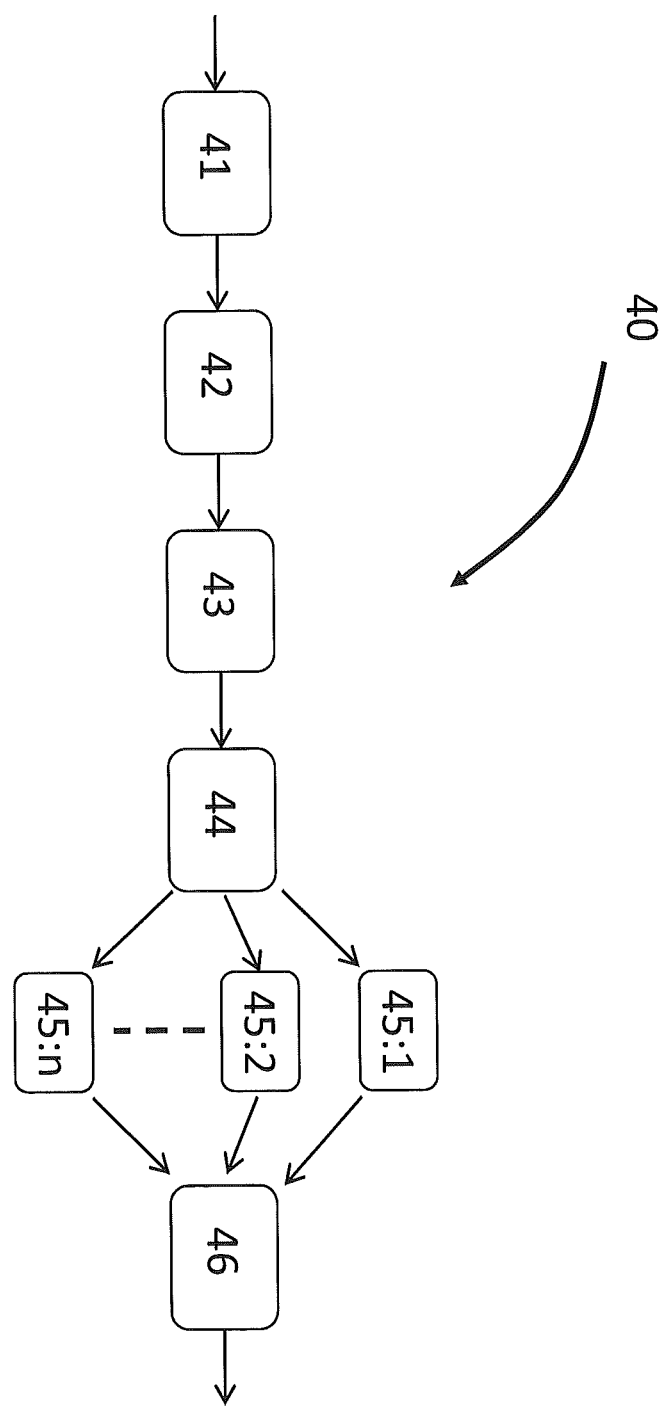
FIG. 3 shows a functional overview of the connectivity engine in accordance with an embodiment of the invention.
Figure 4:
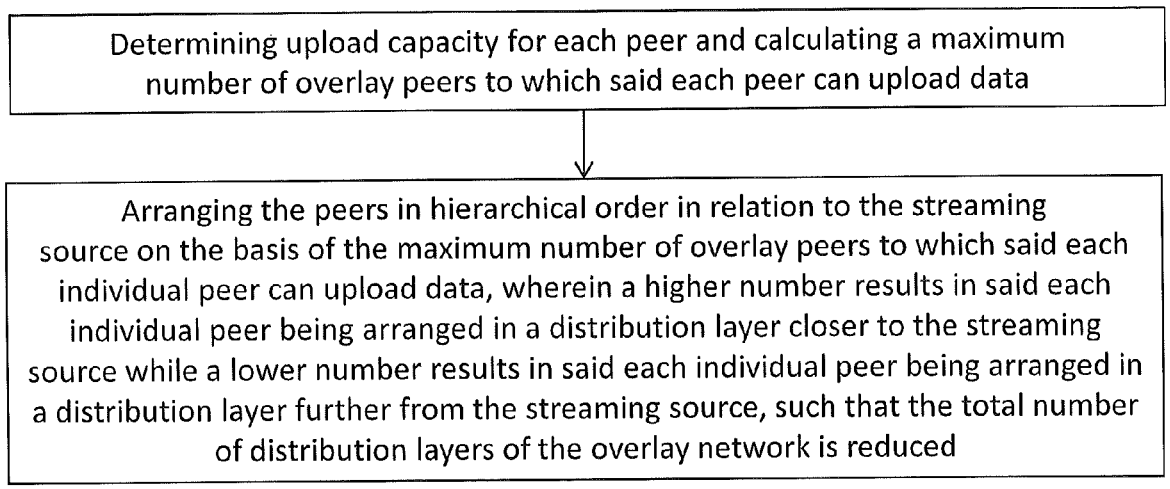
FIG. 4 shows a flowchart of a method in accordance with an embodiment of the invention.

In the above, in connection to FIG. 1, the connectivity engine has been generally described. The connectivity engine is the functional entity that performs the steps of the inventive method set forth in the appended claims. The connectivity engine will be discussed in detail with reference to FIG. 3. When overlay configuration is undertaken, many or all of the different functional components shown in FIG. 3 is used. Again, the engine 40 is typically embodied in the form of a processor included in a computer executing appropriate software stored in associated memory for procuring required functionality. However, other suitable devices with computing capabilities could be used, e.g. an application specific integrated circuit (ASIC), a field programmable gate array (FPGA), a complex programmable logic device (CPLD), etc., in order control the P2P system and arranged the overlay in accordance with embodiments of the present invention, while executing appropriate downloadable software stored in a suitable storage area, such as a RAM, a Flash memory or a hard disk.

Now, with reference to FIG. 3, the input to the connectivity engine 40 is the combined peer state provided by a tracker, while the output are connectivity orders to be provided to the peers to be configured in the P2P overlay.

Thus, in an embodiment of the invention, peer information is input to the connectivity engine 40 comprising upload capacity for each peer. The peer information may further comprise information regarding the capacity of the stripes to be distributed in the P2P network. However, the engine 40 is not necessarily informed of the stripe capacity via the peers, but may alternatively receive information regarding stripe capacity from the streaming source. From this information, the seat count, i.e. the maximum number of overlay peers to which an individual peer can upload data, is calculated. On the basis of the calculated seat count, the peers are arranged in hierarchical order in relation to the streaming source. For a high seat count, the engine 40 places the associated peer in a distribution layer closer to the streaming source, while a low seat count renders a placement further away from the streaming source. In this manner, the total number of distribution layers of the overlay network can be reduced. Output from the engine 40 are connectivity orders to the peers, thereby indicating the hierarchical order according to which the peers should be placed in the distribution layers. That is, the connectivity orders instructs an individual peer which other overlay peers it should connect to such that the number of distribution layers can be reduced.

Effective Bandwidth Penalizer

The effective bandwidth penalizer 41 makes use of selected parts of the reported connectivity information of each peer. For a given peer, this information may come from several sources:

The peer itself
The peer's uploaders
The peer's downloaders

Based on connectivity history, the bandwidth penalizer adjusts the bandwidth of a peer to a level that guarantees robustness of the P2P system. In embodiments of the invention, peers which previously have been reported to fail other downloading peers will be penalized, i.e. moved down in the hierarchy, and thus placed in a distribution layer further away from the streaming source, potentially even further away than what is justified by the determined number of other overlay peers to which the penalized peer uploads data.

Distribution Layer Constructor

The distribution layer constructor 42 carries out the procedure set out in section 4.3.1, i.e. sorts the peers in accordance with their seat count and accordingly places the peers in the required distribution layers.

NAT Based Distribution Layer Adjuster

Based on the peer NAT information, some peers may need to be moved up or down in the distribution layers. This is carried out by NAT based distribution layer adjuster 43 in a manner that tries to maintain bandwidth minimization for the streaming server while insuring that sufficient connectivity flexibility exists between distribution layers for the infra-layer configuration to be effective.

LSAP Formulator

This LSAP formulator 44 defines and calculates the utility matrix $A^r$ taking into account parameters reported in the peer states, including one or more of upload bandwidth, download bandwidth, most recently downloaded part for each substream, downloading peer list, uploading peer list, NAT type, CPU load, current playing point in the stream, rebuffering time, peer IP address, etc. After the calculation has been carried out, the computational load is apportioned and distributed on a number of LSAP Solvers 45. The LSAP formulator also manages the scheduling and effective computational load utilization of the LSAP solvers.

LSAP Solver

The LSAP solvers $45:1, 45:2, \ldots, 45:n$ typically take in the pair wise connectivity utility of peers between two distribution layers and solves an instance of LSAP for every two consecutive distribution layers. In a system of R distribution layers, this translates to R instances of LSAP, where each instance can be solved in parallel. This is where the computationally most demanding calculations of the P2P system must be made. The LSAP solvers must be carefully managed and load balanced. Using an advance heuristic such as DGS, computation can be interrupted if it is deemed that a "good enough" solution is more valuable now, than a "perfect"

solution would be later. The LSAP solvers may, in computationally highly demanding applications, be embodied in the form of separate processors.

Connectivity Order Generator

In the connectivity order generator 46, the outputs of the LSAP solvers 45 is optionally combined with an updated peer state information in order to "tweak" the resultant improved overlay to bring the overlay in-line with recent changes in the P2P network. The connectivity orders are created and sent to peers in a manner that takes into account:

Peer position in the network overlay, peers closer to the streaming source, should update their connections first, since they have the greatest impact on the system.

Network delay between the connectivity engine 40 and the peers. It is preferred that peers in the same hierarchical layer receive the orders simultaneously, if possible.

Although exemplary embodiments of the present invention have been described herein, it should be apparent to those having ordinary skill in the art that a number of changes, modifications or alterations to the invention as described herein may be made. Thus, the above description of the various embodiments of the present invention and the accompanying drawings are to be regarded as non-limiting examples of the invention and the scope of protection is defined by the appended claims. Any reference signs in the claims should not be construed as limiting the scope of protection.

The invention claimed is:

1. A method of arranging a peer-to-peer (P2P) overlay network comprising a streaming source and a plurality of peers arranged in distribution layers, the method comprising:
   determining upload capacity for each peer and calculating a maximum number of overlay peers to which said each peer can upload data; and
   arranging the peers in hierarchical order in relation to the streaming source on the basis of the maximum number of overlay peers to which said each individual peer can upload data, wherein a higher number results in said each individual peer being arranged in a distribution layer closer to the streaming source whereas a lower number results in said each individual peer being arranged in a distribution layer further from the streaming source, such that the total number of distribution layers of the overlay network is reduced.

2. The method of claim 1, wherein the peers are arranged in relation to the streaming source such that a peer of a certain hierarchical order is placed in the same distribution layer, or a distribution layer closer to the streaming source, as compared to a peer of a lower hierarchical order.

3. The method of claim 1, further comprising: receiving peer state information including one or more of the following parameters to be considered when arranging the peers in distribution layers: upload bandwidth, download bandwidth, most recently downloaded pal~ for each sub-stream, downloading peer list, uploading peer list, NAT type, CPU load, current playing point in the stream, rebuffering time, and peer IP address; and
   considering said peer state information when arranging the peers in distribution layers.

4. The method of claim 1, wherein the number of peers to be placed in the layer closest to the streaming source is selected to be as low as possible while still being able to provide a total streaming bandwidth satisfying a predetermined bandwidth threshold value.

5. The method of claim 1, wherein, if an individual peer has been reported as failing to provide a required bandwidth to downloading peers, said individual peer will be moved to a distribution layer further away from the streaming source.

6. The method of claim 1, wherein, if a certain peer cannot be placed in a distribution layer to which it is associated on the basis of its hierarchical order, the peer is placed in a next distribution layer closer to the streaming source.

7. The method of claim 1, further comprising creating, for a first peer in a first distribution layer and a second peer in a second distribution layer to be connected to the first peer, a utility matrix comprising selected network parameters; and
   solving a Linear Sum Assignment Problem (LSAP) using the created utility matrix and considering the solution when arranging the peers in hierarchical order.

8. The method of claim 1, further comprising the sending a connectivity order to the peers, thereby indicating the hierarchical order according to which the peers should be placed in the distribution layers.

9. A device for arranging a peer-to-peer (P2P) overlay network comprising a streaming source and a plurality of peers arranged in distribution layers, the device comprising:
   a processor configured to:
   receive peer information indicating upload capacity for each peer and calculate a maximum number of overlay peers to which said each peer can upload data;
   arrange the peers in hierarchical order in relation to the streaming source on the basis of the maximum number of overlay peers to which said each peer can upload data, wherein a higher number results in said each individual peer being arranged in a distribution layer closer to the streaming source whereas a lower number results in said each individual peer being arranged in a distribution layer further from the streaming source, such that the total number of distribution layers of the overlay network is reduced; and
   send connectivity orders to the peers, thereby indicating the hierarchical order according to which the peers should be placed in the distribution layers.

10. The device of claim 9, said processor being configured to arrange the peers in relation to the streaming source such that a peer of a certain hierarchical order is placed in the same distribution layer, or a distribution layer closer to the streaming source, as compared to a peer of a lower hierarchical order.

11. The device of claim 9, said processor further being configured to: receive peer state information including one or more of the following parameters to be considered when arranging the peers in distribution layers: upload bandwidth, download bandwidth, most recently downloaded part for each sub-stream, downloading peer list, uploading peer list, NAT type, CPU load, current playing point in the stream, rebuffering time, and peer IP address; and
   consider said peer state information when arranging the peers in distribution layers.

12. The device of claim 9, wherein the processor is configured to select the number of peers to be placed in the layer closest to the streaming source to be as low as possible while still being able to provide a total streaming bandwidth satisfying a predetermined bandwidth threshold value.

13. The device of claim 9, wherein said processor is configured move an individual peer to a distribution layer further away from the streaming source if said individual peer has been reported as failing to provide a required bandwidth to downloading peers.

14. The device of claim 9, wherein said processor is configured to place a certain peer in a next distribution layer closer to the streaming source, if said certain peer cannot be placed in a distribution layer to which it is associated on the basis of its hierarchical Order.

15. The device of claim 9, said processor further being configured to:
- create, for a first peer in a first distribution layer and a second peer in a second distribution layer to be connected to the first peer, a utility matrix comprising selected network parameters; and
- solve a Linear Sum Assignment Problem (LSAP) using the created utility matrix and considering the solution when arranging the peers in hierarchical order.

16. The device of claim 9, said processor further being configured to:
- send a connectivity order to the peers, thereby indicating the hierarchical order according to which the peers should be placed in the distribution layers.

17. A computer program product comprising computer-executable components configured to cause a device to perform the method steps recited in claim 1 when the computer-executable components are configured to run on a processor included in the device.

18. The method of claim 1, wherein arranging the peers comprises:
- arranging the peers such that ones of the peers capable of providing a higher bandwidth are closer to the streaming source.

* * * * *

UNITED STATES PATENT AND TRADEMARK OFFICE
CERTIFICATE OF CORRECTION

Page 1 of 1

PATENT NO. : 8,806,049 B2
APPLICATION NO. : 13/112778
DATED : August 12, 2014
INVENTOR(S) : Mohammed El-Beltagy It is certified that error appears in the above-identified patent and that said Letters Patent is hereby corrected as shown below:

In the Claims:

Column 11, Claim 3, Line 53: Please correct "pal~ for each"
to read -- part for each --

Column 12, Claim 8, Line 12: Please correct "comprising the sending a"
to read -- comprising: sending a --

Column 12, Claim 14, Line 67: Please correct "hierarchical Order."
to read -- hierarchical order. --

Column 13, Claim 17, Line 17: Please correct "method steps recited"
to read -- method recited --

Signed and Sealed this
Tenth Day of February, 2015

Michelle K. Lee
*Deputy Director of the United States Patent and Trademark Office*